United States Patent
Jarrett et al.

(10) Patent No.: US 10,259,576 B2
(45) Date of Patent: Apr. 16, 2019

(54) ARTICULATED MAIN ROTOR HUB WITH INWARDLY CF BEARING AND 3% FLAPPING HINGE OFFSET

(71) Applicant: BELL HELICOPTER TEXTRON INC., Fort Worth, TX (US)

(72) Inventors: Chad Lewis Jarrett, Arlington, TX (US); Frank Bradley Stamps, Colleyville, TX (US); Glenn Shimek, Kennedale, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 15/709,153

(22) Filed: Sep. 19, 2017

(65) Prior Publication Data

US 2018/0093764 A1    Apr. 5, 2018

Related U.S. Application Data

(63) Continuation of application No. 14/202,617, filed on Mar. 10, 2014, now Pat. No. 9,764,831.

(51) Int. Cl.
*B64C 27/51*   (2006.01)
*B64C 27/605*  (2006.01)
*B64C 27/35*   (2006.01)

(52) U.S. Cl.
CPC ............ *B64C 27/605* (2013.01); *B64C 27/35* (2013.01)

(58) Field of Classification Search
CPC ........ B64C 11/02; B64C 11/04; B64C 27/605
USPC .................................. 416/103, 105, 106, 148
See application file for complete search history.

(56) References Cited

U.S. PATENT DOCUMENTS

| | | | |
|---|---|---|---|
| 3,804,552 A | 4/1974 | Covington | |
| 3,853,426 A | 12/1974 | Rybicki | |
| 3,967,918 A | 7/1976 | Mouille | |
| 4,135,856 A * | 1/1979 | McGuire | B64C 27/35 416/134 A |
| 4,257,739 A | 3/1981 | Covington | |
| 4,342,540 A | 8/1982 | Lovera | |
| 4,361,415 A * | 11/1982 | Aubry | B64C 27/51 416/134 A |
| 5,913,659 A * | 6/1999 | Doolin | B64C 27/008 267/141.4 |
| 7,658,546 B2 * | 2/2010 | Clarke | F16C 11/0614 384/192 |
| 8,257,051 B2 | 9/2012 | Stamps | |
| 8,444,382 B2 | 5/2013 | Stamps | |
| 2003/0068104 A1 * | 4/2003 | Loftus | B64C 27/32 384/215 |
| 2007/0019895 A1 * | 1/2007 | Smith | F16C 11/0614 384/192 |
| 2008/0136071 A1 * | 6/2008 | Weisbeck | F16F 1/38 267/136 |
| 2009/0175725 A1 | 7/2009 | Podgurski | |
| 2011/0027083 A1 | 2/2011 | Stamps | |

(Continued)

*Primary Examiner* — Reinaldo Sanchez-Medina
(74) *Attorney, Agent, or Firm* — James E. Walton

(57) ABSTRACT

A rotary system including a grip having an opening forming a first bridge for receiving a centrifugal force bearing that faces inwardly towards the rotor mast. A rotor blade couples to the grip and a pitch horn positioned outside the opening pitches the rotor blade during flight. A bearing assembly attaches the first bridge to the yoke and controls blade forces exerted against the hub assembly during flight.

17 Claims, 4 Drawing Sheets

(56) References Cited

U.S. PATENT DOCUMENTS

| | | | |
|---|---|---|---|
| 2012/0051679 A1* | 3/2012 | Bridgewater | F16C 17/18 384/206 |
| 2012/0051909 A1 | 3/2012 | McGuire | |
| 2013/0164131 A1 | 6/2013 | Russell | |
| 2013/0216382 A1 | 8/2013 | Wiinikka | |
| 2013/0216384 A1 | 8/2013 | Stamps | |
| 2013/0341458 A1* | 12/2013 | Sutton | B64C 27/54 244/17.25 |

* cited by examiner

US 10,259,576 B2

ARTICULATED MAIN ROTOR HUB WITH INWARDLY CF BEARING AND 3% FLAPPING HINGE OFFSET

BACKGROUND

1. Field of the Invention

The present application relates generally to the field of rotary systems, and more particularly, to a rotary system having an inwardly facing CF bearing assembly.

2. Description of Related Art

Rotary systems are well known in the art for effectively utilizing a plurality of rotor blades to create horizontal and vertical flight. During operation, the rotor blades exert forces, for example, lead/lag, feathering, centrifugal, coning, and/or flapping forces, on the hub assembly, which could result in the rotary system failing. For this reason, the rotary system will typically utilize one or more different types of devices that compensate for these forces. In some embodiments, the rotary system could include elastomeric elements, spring-rate dampers, bearings, and/or other suitable means for reducing, and in some cases eliminating, the effects of these forces on the hub assembly.

Conventional rotary systems also comprise one or more different devices for manipulating movement of the rotor blade during flight, for example, a centrifugal force bearing facing outwardly.

Although great strides have been made in the field of rotary systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
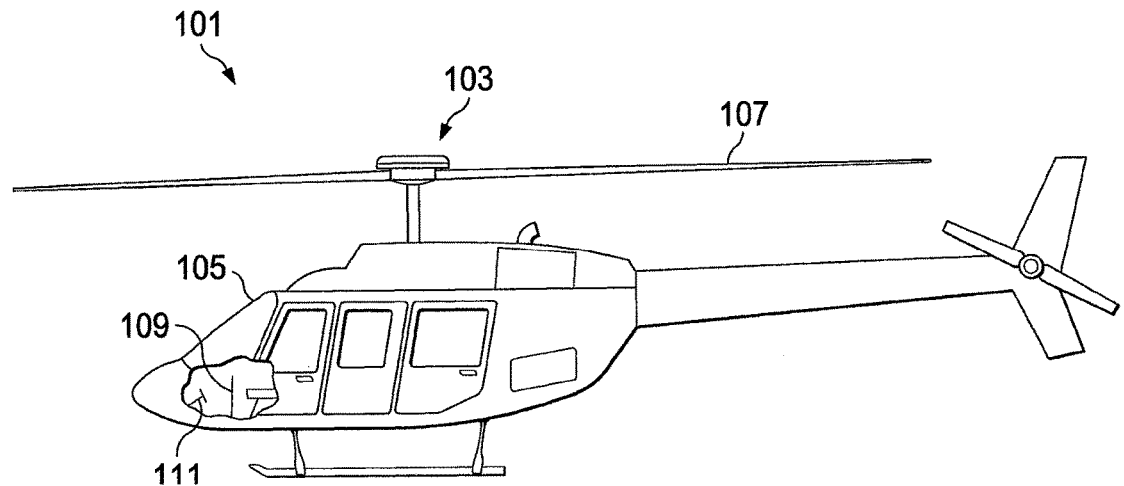
FIG. 1 is a side view of a rotary aircraft utilizing a rotary system of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the rotary system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The rotary system of the present application provides significant advantageous over conventional rotary systems. Specifically, the rotary system utilizes a hub assembly having a bearing assembly, namely, a spherical bearing configured to reduce, and in some cases eliminate, the rotor blade forces exerted on the hub assembly during flight. Further, the hub assembly is provided with a pitch horn selectively positioned outside the yoke, which allows an increase pitch horn longitudinal length and a greater pitching moment exerted on the rotor blade. These and other unique features of the rotary system are discussed in detail below.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 2:
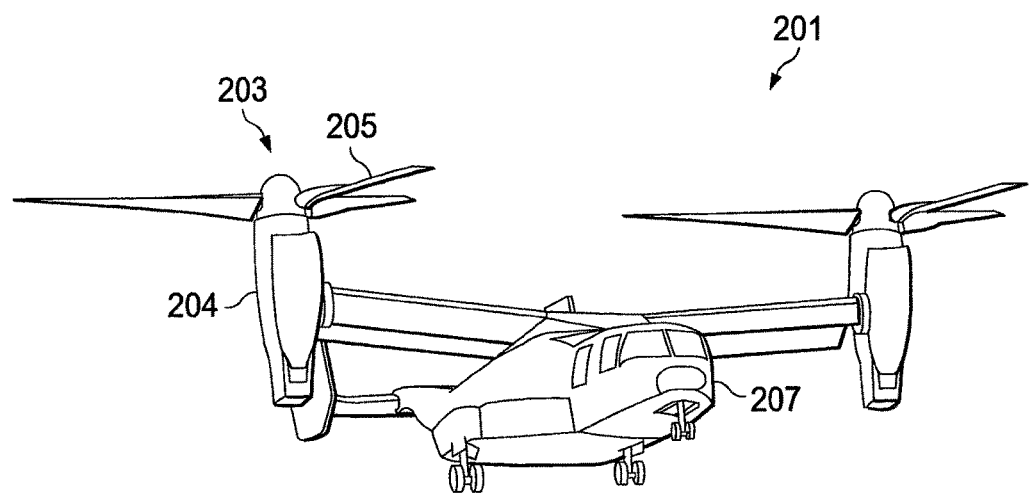
FIG. 2 is an oblique view of a tiltrotor aircraft utilizing the rotary system of the present application.

Referring now to the drawings wherein like reference characters identify corresponding or similar elements throughout the several views, FIGS. 1 and 2 show two different rotary aircraft utilizing the rotary system of the present application. FIG. 1 depicts a side view of a helicopter 101, while FIG. 2 depicts an oblique view of a tiltrotor aircraft 201.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotary systems 203 having rotor blades 205 carried by rotatable nacelles 204. The rotatable nacelles provide means for allowing aircraft 201 to takeoff and land like a conventional helicopter and for horizontal flight like a conventional fixed wing aircraft. It should be understood that, like helicopter 101, tiltrotor aircraft 201 is provided with controls, e.g., cyclic controllers and pedals, carried within fuselage 207 for controlling movement of the aircraft.

Figure 3:
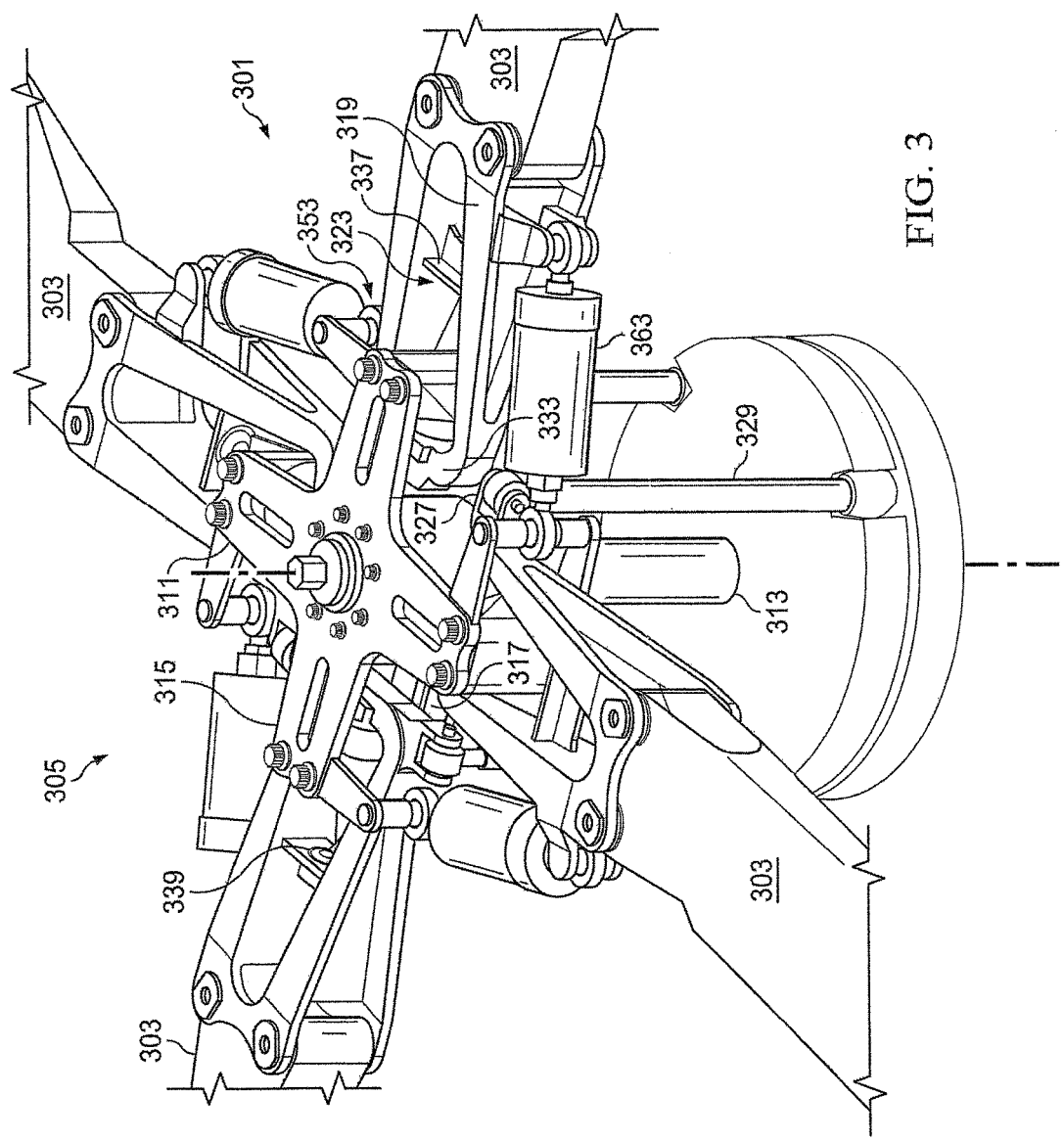
FIG. 3 is an oblique view of the rotary system of the present application.
Figure 4:
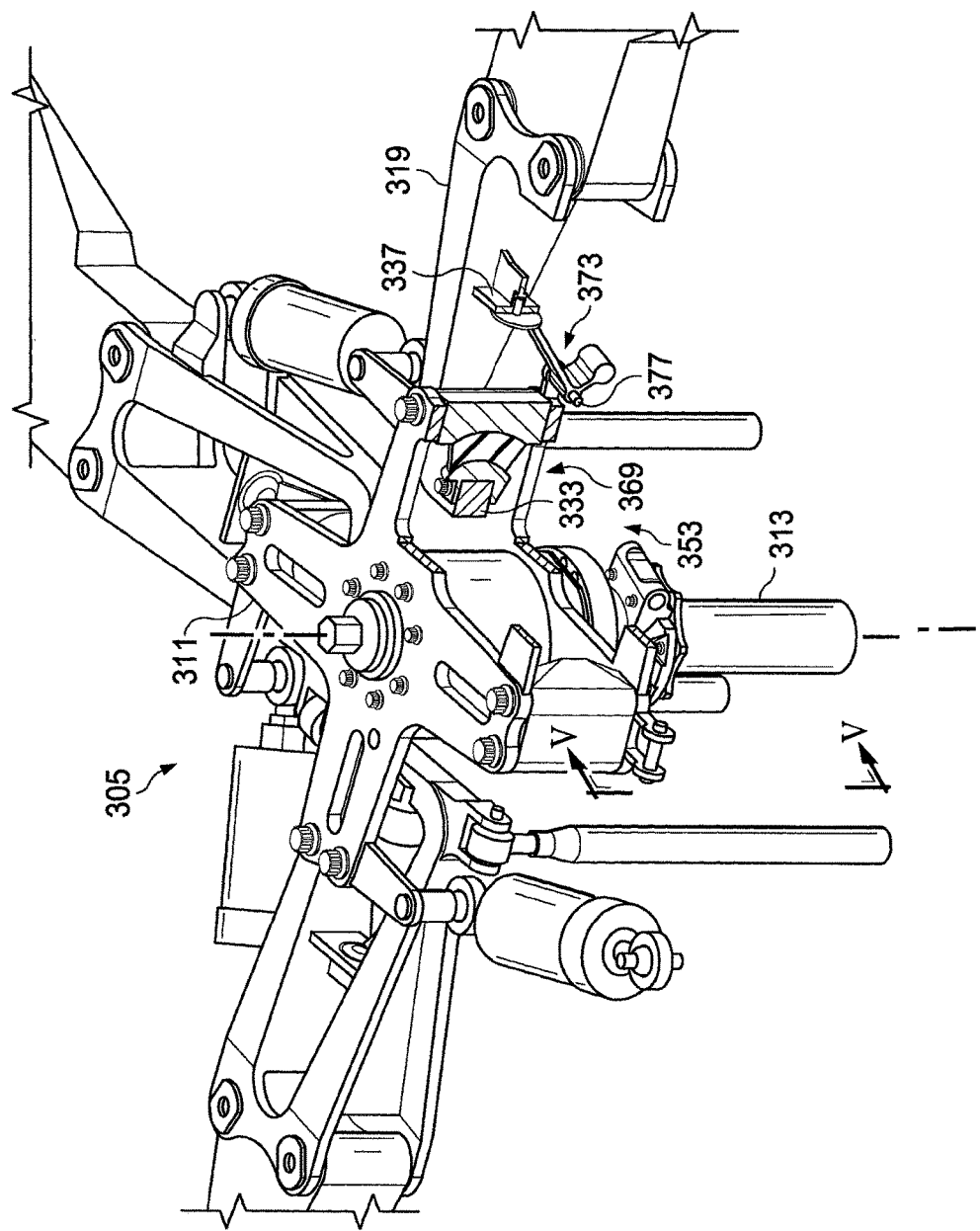
FIG. 4 is an oblique view of a portion of the rotary system of FIG. 3 according to the present application.
Figure 5:
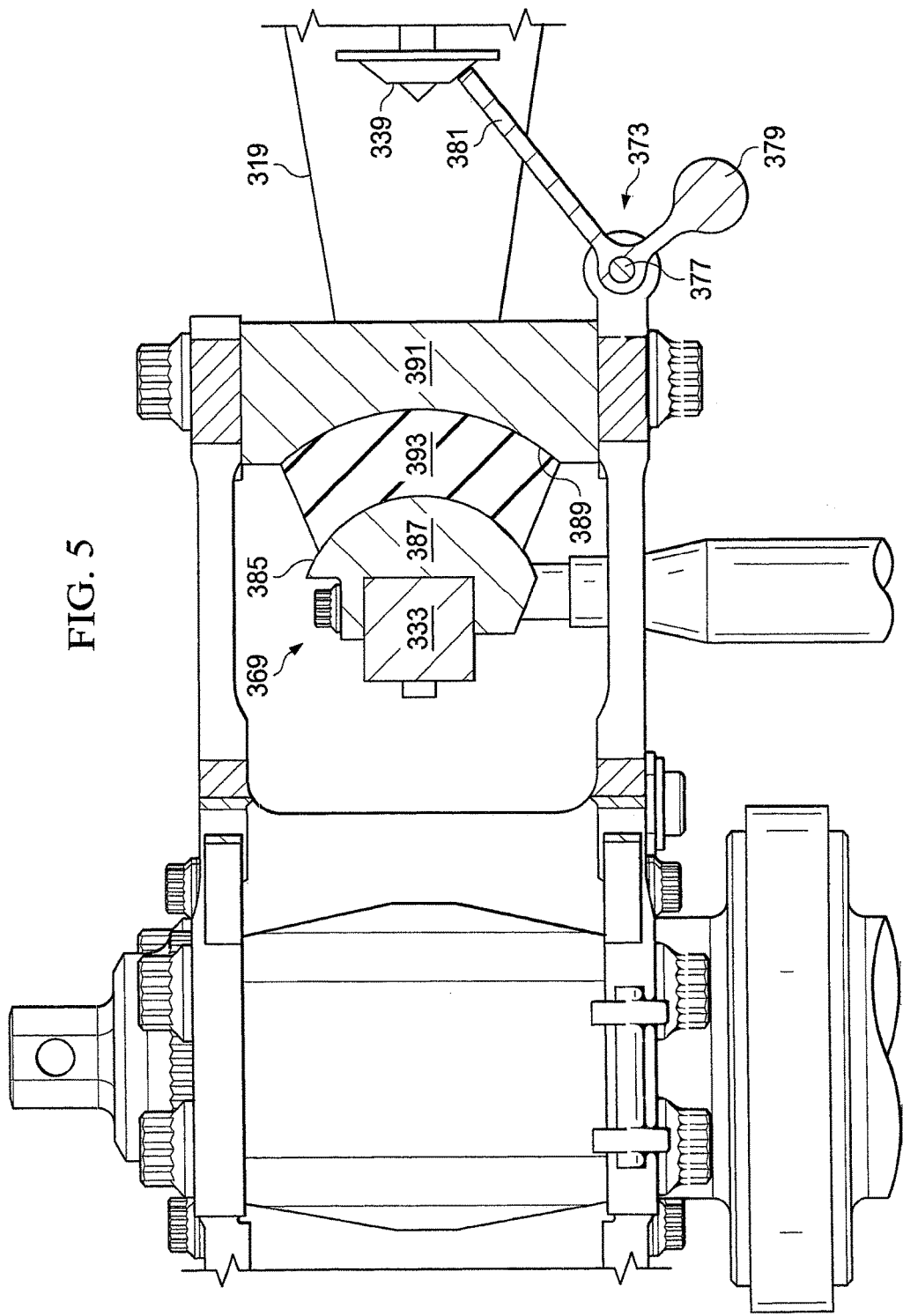
FIG. 5 is a cross-sectional view of the rotary system of FIG. 3 taken at V-V of the present application.

Referring now to the remaining FIGS. 3-5, various views of a rotary system 301 according to the preferred embodiment of the present application are shown. It will be appreciated that rotary system 301 provides effective means for controlling flight of a rotary aircraft, and is provided with one or more unique systems and devices for compensating rotor blade forces exerted against the hub assembly during flight. It should be understood that both rotary systems 103 and 203 discussed herein comprise one or more of the features of rotary system 301. Thus, the features of rotary system 301 are incorporated in rotary systems for helicopters, tilt rotor aircraft, and other types of rotary aircraft. It should be apparent that the systems described herein could be implemented on a main rotor and a tail rotor as required.

Referring specifically to FIG. 3 in the drawings, rotary system 301 comprises a plurality of rotor blades 303 operably associated with a hub assembly 305. During operation, an aircraft engine (not shown) drives and rotates hub assembly 305 that in turn creates aircraft flight via rotor blades 303. In the exemplary embodiment, rotary system 301 is shown having four rotor blades 303; however, it will be appreciated that the features of rotary system 301 could easily be adapted for use with more or less rotor blades, depending on the desired embodiment. For ease of description, one of the four blades 303 and devices operably associated therewith are discussed in detail. However, it should be understood that the remaining three blades and operably associated devices are substantially similar in form and function to blade 303 and include the features discussed herein.

Hub assembly 305 comprises a yoke 311 rigidly attached to a rotor mast 313 by a chalice. Yoke 311 preferably has an upper plate 315 and a lower plate 317 coupled together by the chalice. During operation, mast 313 rotates yoke 311, which in turn rotates blades 303 attached thereto. Blade 303 attaches to yoke 311 via a grip member 319.

Hub assembly 305 preferably comprises a swashplate (not shown) operably associated with yoke 311. Swashplate controls pivoting movement of blades 303 during flight, in particular, swashplate pivotally attaches to pitch horn 327 via a pitch link 329, and manipulates the pitch angle of rotor blade 303 during flight via pitch horn 327. In the preferred embodiment, pitch horn 327 has a longitudinal length that extends in a direction relatively tangential to the longitudinal length of blade 303.

In some embodiments, a greater pitch horn length is desired to increase the pitching moment exerted on the rotor blades. For example, in some embodiments large, heavier rotor blades are utilized to increase the aircraft lifting capacity. As the blade size increases, the required pitching moment also increases. Having the pitch horn disposed within the yoke opening is limited to the yoke dimensions, while on the other hand, the preferred embodiment of the present application allows for an arm length greater than the dimensions defined by the yoke opening.

Blade grip 319 includes a thickness allowing opening 323 to form a first bridge 333 for securing grip 319 to yoke 311. In the preferred embodiment, a bearing assembly 353 is utilized to secure grip 319 to yoke 311 via first bridge 333 and the bearing assembly 353 is configured to control the blade forces exerted against yoke 311. In the exemplary embodiment, rotor blade 303 is attached to yoke 311 via first bridge 333 and with a lead/lag damper 363, which pivotally attaches directly to yoke 311 and grip 319. It will be appreciated that the dimensional length, thickness, and width of first bridge 333 can easily be modified in different embodiments to accommodate different loads exerted thereagainst via the rotor blades 303 during flight. Located interior to the opening 323 is a second bridge 337 that spans from one edge of the grip 319 to the opposite edge of the grip 319 across the opening 323. Second bridge 337 includes a stop 339 facing inwards towards the rotor mast 313. Stop 339 is typically formed of a metallic compound capable of providing a rest for the grip 311 during periods of low centrifugal force.

In FIGS. 4 and 5, respective perspective cross-sectional and simplified side cross-sectional views of a portion of hub assembly 305 are shown. FIG. 5 has some elements removed to simplify the drawing.

Bearing assembly 353 preferably comprises first bearing 369 configured to elastically attach yoke 311 to an inner surface of first bridge 333. In the preferred embodiment, bearing 369 is composed of an elastomeric material that allows for elastic deformation as blade 303 moves relative to yoke 311. Further description and illustration of these features are provided below.

Coning stop 373 is configured to provide support to an opposing inwardly facing surface of grip 319. As discussed, grip 319 is supported via coning stop 373 during periods of low centrifugal force on the rotor system 305. In the preferred embodiment, coning stop 373 compensates for blade flapping during startup and shut down of the rotor system 305. Yoke 311 includes an attachment means 377 extending from yoke 311 that is utilized to fit within a hole of coning stop 373. Attachment means 377 is preferably a circular shaft having a diameter substantially equal to the inner diameter of hole. Coning stop 373 includes a first member 379, and a second member 381 rigidly attached to first member 379 at typically a right angle. First member 379 is weighted such that at typical operating speeds, the centrifugal force of the spinning rotor system 305 forces second member 381 to rotate into a more vertical position such that the grip 319 is unsupported by coning stop 373. As the rotor system 305 slows down and the centrifugal force exerted on the first member 379 is decreased, the second member 381 rotates outward and provides resting support for grip 319 against stop 339 located in the second bridge 337.

Bearing 369 includes an inner member 387, an outer member 391, and an elastomeric portion 393, and is preferably a lensed spherical centrifugal bearing having a conical profile bounded substantially by a pair of coaxial spherical surfaces, the first of which is formed on a corresponding spherical surface 385 of inner member 387, and the second of which is formed on a corresponding spherical surface 389 of an outer member 391 fixedly attached to yoke 311. Having the conical profile point inwardly forces the inner member 387 to be narrower than the outer member 391. Outer member 391 or the first end portion of the bearing 369 rigidly connects bearing 369 to yoke 311. Inner member 387 or the second end portion of the bearing 369 is rigidly coupled to the grip 319 and pivots with the grip 319. Inner member 387 is mechanically coupled to the outer member 391 by the elastomeric portion 393. Inner member 387 received centrifugal compression forces from the grip 319 along a longitudinal bearing axis; furthermore, the inner member 387 rotates relative to the outer member 391 about the longitudinal bearing axis. The apex of the conical profile of bearing 369 is positioned towards the center of the rotor system, for example the rotor mast 313. Bearing 369 includes a focal center positioned towards the rotor mast 313 and the center of the yoke 311 and therefore is inwardly facing. Additionally, the focal center of the bearing 369 is preferably located at the same blade station as the center of the pivot attachment between the lead/lag damper 363 and the yoke 311.

The two members to which the spherical surfaces of bearing 369 are coupled constitute together with the bearing a single mechanical element. In this respect, the connection between the bearing 369 and inner member 387 (by way of surface 385) and between the bearing 369 and outer member 391 (by way of surface 389) is permanent, and is made for example by vulcanizing the elastomeric material constituting the bearing 369 directly on to these surfaces, or alternatively by fixing the material in any other non-removable manner to the two members. Bearing 369 is preferably provided with a plurality of rigid shims or plies disposed and layered therein the elastomeric portion 393.

Rotating the centrifugal force bearing from pointing outwards to pointing inwards results in a flapping hinge offset between 2% to 4%, and the delta three of the rotor system remains at approximately 0 degrees. Additionally, the inwardly facing centrifugal force bearing reduces loads experienced by the rotor, system resulting in reduced weight for an articulated rotor.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary system for a rotary aircraft, comprising:
   a rotor mast;
   a rotor blade;
   a coning stop, the coning stop having:
      a weighted first member; and
      a second member; and
   a hub assembly, having;
      a yoke;
      a grip rigidly attached to the rotor blade; and
      a bearing assembly having a spherical centrifugal bearing having a conical profile bounded substantially by a pair of coaxial spherical surfaces;
      wherein the spherical centrifugal bearing secures the grip to the yoke;
      wherein the grip rests on the second member of the coning stop during periods of low centrifugal force exerted on the rotary system;
      wherein an area of the coaxial spherical surface closest to the rotor mast is smaller as compared to an area of the coaxial spherical surface furthest away from the rotor mast;
      wherein the bearing assembly is operably associated with the grip, the bearing assembly being configured to attach the grip to the yoke; and
      wherein the bearing assembly controls blade forces exerted against the hub assembly during flight.

2. The rotary system for a rotary aircraft according to claim 1, wherein an apex of the spherical centrifugal bearing is positioned towards the rotor mast.

3. The rotary system for a rotary aircraft according to claim 1, wherein the spherical centrifugal bearing is asymmetrical shaped.

4. The rotary system for a rotary aircraft according to claim 1, wherein the second member is located at a right angle of the weighted first member.

5. A rotary system for a rotary aircraft, comprising:
   a rotor mast;
   a rotor blade;
   a hub assembly, having;
      a yoke;
      a grip rigidly attached to the rotor blade; and
      a bearing assembly having a spherical centrifugal bearing having a conical profile bounded substantially by a pair of coaxial spherical surfaces; and
   a damper pivotally connecting the yoke to the grip;
   wherein the spherical centrifugal bearing secures the grip to the yoke;
   wherein an area of the coaxial spherical surface closest to the rotor mast is smaller as compared to an area of the coaxial spherical surface furthest away from the rotor mast;
   wherein the bearing assembly is operably associated with the grip, the bearing assembly being configured to attach the grip to the yoke;
   wherein the bearing assembly controls blade forces exerted against the hub assembly during flight; and
   wherein a focal center of the bearing assembly is located at a blade station equal to a blade station of a center of the pivotal attachment between the damper and the yoke.

6. The rotary system for a rotary aircraft according to claim 5, further comprising a coning stop.

7. The rotary system for a rotary aircraft according to claim 6, the coning stop having:
   a weighted first member; and
   a second member;
   wherein the grip rests on the second member during periods of low centrifugal force exerted on the rotary system.

8. The rotary system for a rotary aircraft according to claim 7, wherein the second member is located at a right angle of the weighted first member.

9. The rotary system for a rotary aircraft according to claim 5, wherein an apex of the spherical centrifugal bearing is positioned towards the rotor mast.

10. The rotary system for a rotary aircraft according to claim 5, wherein the spherical centrifugal bearing is asymmetrical shaped.

11. A rotary system for a rotary aircraft, comprising:
    a rotor mast;
    a rotor blade;
    a coning stop pivotally attached to the yoke, the coning stop having:
       a weighted first member; and
       a second member; and
    a hub assembly, having;
       a yoke;
       a grip rigidly attached to the rotor blade; and
       a bearing assembly attaching the yoke to the grip of the rotor blade, the bearing assembly having a spherical centrifugal bearing having a conical profile bounded substantially by a pair of coaxial spherical surfaces;
       wherein an area of the coaxial spherical surface closest to the rotor mast is smaller as compared to an area of the coaxial spherical surface furthest away from the rotor mast;
       wherein the grip rests on the second member during periods of low centrifugal force exerted on the rotary system;
       wherein the bearing assembly is operably associated with the grip, the bearing assembly being configured to attach the grip to the yoke; and
       wherein the bearing assembly controls blade forces exerted against the hub assembly during flight.

12. The rotary system for a rotary aircraft according to claim 11, wherein the spherical centrifugal bearing is asymmetrical shaped.

13. The rotary system for a rotary aircraft according to claim 11, wherein the second member is located at a right angle of the weighted first member.

14. The rotary system for a rotary aircraft according to claim 11, wherein an apex of the spherical centrifugal bearing faces where the spherical centrifugal bearing attaches to the yoke.

15. The rotary system for a rotary aircraft according to claim 11, wherein an apex of the spherical centrifugal bearing is positioned towards the rotor mast.

16. The rotary system for a rotary aircraft according to claim 11, wherein the yoke is comprised of an upper plate and a lower plate.

17. The rotary system of claim 11, further comprising:
a damper pivotally connecting the yoke to the grip;
wherein a focal center of the bearing assembly is located at a blade station equal to a blade station of a center of the pivotal attachment between the damper and the yoke.

* * * * *